United States Patent Office 3,378,515
Patented Apr. 16, 1968

3,378,515
ELASTOMERIC REACTION PRODUCTS OF PARTIALLY HYDROLYZED COPOLYMERS OF ETHYLENE AND VINYL ACETATE WITH TOLYLENEDIISOCYANATES AND COMPOSITIONS COMPRISING SAME
Ival O. Salyer, Dayton, and Carmen L. Bellanca, Centerville, Ohio, assignors to Monsanto Research Corporation, St. Louis, Mo., a corporation of Delaware
No Drawing. Filed Dec. 28, 1964, Ser. No. 421,659
18 Claims. (Cl. 260—41)

ABSTRACT OF THE DISCLOSURE

Elastomers comprising the reaction product of partially hydrolyzed copolymers of ethylene and vinyl acetate with tolylenediisocyanates, and the process of preparing same. Said elastomers may be blended with fillers such as carbon black, plasticizers, stabilizers, flameproofing agents, etc., prior to curing, and they are useful for ring seals in hydraulic systems.

This invention relates to new compositions of matter and more particularly provides improved elastomeric materials by modification of partially hydrolyzed ethylene/vinyl alkanoate copolymers and the method of preparing the products.

Hydrolyzed copolymers of ethylene and vinyl alkanoate are well-known; see, e.g., U.S. Patent Nos. 2,386,347, 2,399,653, 2,403,464–5, 2,434,179, 2,448,946, 2,451,963, 2,467,196 and 3,114,736. They are generally prepared by treating an ethylene/vinyl alkanoate copolymer with an acidic or alkaline hydrolyzing agent. Depending upon the hydrolysis conditions some or all of the ester groups are converted to hydroxy radicals. Complete hydrolysis results in a copolymer consisting of ethylene and vinyl alcohol units. When the hydrolysis is incomplete, the hydrolyzed copolymer consists also of vinyl ester units.

The properties of partially hydrolyzed copolymer depend upon the proportion of ethylene, vinyl alcohol and vinyl ester units present. Generally, as the number of alcohol units increases, the flexibility of the copolymer decreases, but the solubility of the copolymer decreases also and begins to approach that of polyvinyl alcohol, particularly if the copolymer contains a low ratio of ethylene/vinyl alcohol units. The presence of unhydrolyzed vinyl alkanoate also affects the solubility characteristics of the hydrolyzed product; more significantly, however, the number of ester units determines plasticity of the hydrolyzed copolymer. Crystallinity is destroyed with increasing ester content; hence, the alkanoate radical appears to be the plasticizing component. Owing to these functions of the ester group, the completely hydrolyzed rather than the partially hydrolyzed copolymers are generally preferred for use as molding resins and for the production of fibers.

In view of the individual effects of the three different units present in partially hydrolyzed ethylene/vinyl alkanoate copolymers, the tailoring of copolymers for specific applications may appear to present an easy means of supplying polymeric products of almost any desired properties. However, the balancing of the hydrophobic- and crystallinity-inducing effect of the hydrocarbon units with the plasticizing effect of the ester units and the rigidizing and insolubilizing effects of the alcohol units has generally been difficult to achieve. Usually, the attainment of one desired property has been possible only at the sacrifice of another. This situation has obtained particularly in the field of elastomers where the required flexibility and toughness have been usually secured only at the expense of decrease in solvent resistance. Since rubbery materials are generally exposed to numerous solvents, particularly those of a hydrocarbon nature such as the petroleum-derived lubricants and fuels, the usual approach has been to decrease the quantity of or to vary the nature of the hydrocarbon units of the copolymer. But thereby decreased flexibility and toughness resulted.

Although extensive treatment of the partially hydrolyzed copolymers with a cross-linking agent has been suggested as a means of increasing the solvent-resistance of the elastomeric copolymers, the cross-linking has generally had an adverse effect on elasticity: although the desired effect on solubilizing property was obtained, the products were brittle solids rather than hard rubbers.

Accordingly, an object of this invention is to obtain from partially hydrolyzed ethylene/vinyl alkanoate copolymers, a rubbery product having good resistance to solvents. Another object is to convert partially hydrolyzed ethylene/vinyl alkanoate copolymers into tough elastomers having utility as oil-resistant gaskets, washers, and sealers, generally. A further object is the provision of tough, rubbery, molded objects having improved resistance to polar and non-polar solvents. Still another object is the provision of O-rings and gaskets, in general, having increased resistance to attack by functional fluids. Still another object is the provision of O-rings seals, and gaskets in general possessing improved resistance to aliphatic and aromatic hydrocarbon solvents and organic phosphate ester solvents. A specific objective of this invention is to provide O-rings, seals, and gasket materials which can be used in aircraft hydraulic systems with hydrocarbon base hydraulic fluid, organic phosphate ester hydraulic fluid, or mixtures of them.

It can be readily appreciated that the fire hazard in aircraft emergency situations can be markedly decreased by use of non-burning hydraulic fluids such as the phosphate ester types. However, phosphate ester fluids are more expensive and accordingly, to reduce costs, both hydrocarbon and phosphate ester fluids are generally used in the hydraulic systems of both civilian and military aircraft. In each instance, the O-rings and seals in the hydraulic system are made from rubber which is resistant to the specific type of hydraulic fluid used in the aircraft. Rubbers are readily available which because of their chemical composition are inherently resistant to one or the other of these two types of functional fluids. Butyl rubber for example, is resistant to polar phosphate esters, but is highly swollen in hydrocarbon type fluids. Buna N, nitrile rubber, is quite resistant to hydrocarbon solvents and hydraulic fluids, but is highly swollen and deteriorated by phosphate esters. Especially in military operation of aircraft, it is not possible to always have on hand sufficient stocks of both types of hydraulic fluids, nor is it always known with certainty what type of fluid (and seals) are already in the aircraft hydraulic system. Thus inadvertent use of the wrong type of hydraulic fluid could lead to failure of the aircraft hydraulic system and possible loss of the aircraft and its personnel.

According to the present invention, there are provided rubbers having a high solubility parameter. We have found that the partial hydrolysis products of certain ethylene/vinyl alkanoate copolymers can be converted into rubbery compositions which are relatively unaffected by either hydrocarbon or phosphate ester hydraulic fluids. Thereby, there are provided seals suitable for use with either type of hydraulic fluid and having an added margin of safety against the accidental use of the wrong fluid. The present invention thus provides hydraulic systems comprising as the operative fluid an oil selected from the class consisting of hydrocarbon mineral oils and phosphate ester base oils, and ring seals cooperating with said fluid in operating the system and possessing increased resistance to attack by said fluid.

The present rubbers are obtained, according to this invention by the process wherein a substantially 4.6:1 to 1.3:1 ethylene/vinyl alkanoate copolymer which has been from 20% to 75% hydrolyzed and in which each alkanoate radical has from 2 to 5 carbon atoms, is blended with at least 0.1% by weight of the hydrolyzed copolymer of an aromatic diisocyanate selected from the class consisting of the ar,ar-diisocyanatotoluenes and the dimers thereof, and the resulting blend is heated at 100° C. to 300° C. to obtain a hard, cured rubber. The preferred polymeric products will generally be from substantially 3.8:1 to substantially 1.6:1 molar ratio ethylene/vinyl alkanoate polymers which have been from substantially 35% to 55% hydrolyzed.

By percent hydrolysis is meant the percentage of vinyl alkanoate of the unhydrolyzed copolymer which has been converted to copolymerized vinyl alcohol.

Aromatic substitution by two isocyanato radicals is denoted by "ar,ar" the ar,ar-diisocyanatotoluenes having the formula

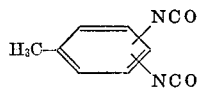

The dimers are heterocyclic nitrogen compounds of complex structure. Thus according to A. Davis, Makromol. Chem. 66, 196–204 (1963), the dimer of 2,4-diisocyanatotoluene has the structure

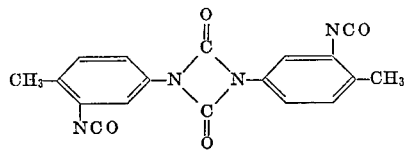

Heating of the mixture of the aromatic diisocyanate and the hydrolyzed copolymer may be conducted before, simultaneously with, or subsequently, to molding, extruding or calendering. Temperatures, of from, say 50° C. to 250° C. are useful. To obtain molded objects of the cross-linked polymer, the blend of aromatic diisocyanate and hydrolyzed copolymer are advantageously molded under heat and pressure. Molding conditions will generally involve a temperature of from 100° C. to 250° C. and a pressure of 50 to 1000 p.s.i., and preferably 110–135° C. at 100 to 400 p.s.i.

Hydrolyzed copolymers of ethylene/vinyl alkanoates having from 2 to 5 carbon atoms are useful for the present purpose so long as the molar ratio of ethylene to ester and the extent of hydrolysis are within the herein specified ranges; i.e., there may be employed hydrolyzed copolymers of ethylene and either vinyl acetate, vinyl propionate, vinyl isobutyrate or vinyl butyrate. Vinyl acetate is preferred. Particularly valuable elastomers are obtained by curing blends of the ar,ar-diisocyanatotoluene and a substantially 3.8:1 to 1.6:1 molar ratio ethylene/vinyl acetate copolymer which has been from 35% to 55% hydrolyzed. Such copolymers correspond to 50:50 to 55:65 weight ratio ethylene/vinyl acetate copolymers which have been from 35% to 55% hydrolyzed. When the blend of hydrolyzed copolymer and diisocyanate is to be used as a molding mix, comminuted, solid copolymer is conveniently incorporated with the likewise solid and comminuted diisocyanate on mill rolls or in Banbury mixer. The diisocyanate may be gradually added to the copolymer as it is being worked on the mill rolls. For some purposes, it may be advantageous to blend one or more additives, e.g., fillers, pigment plasticizers and heat- and/or light-stabilizers, flameproofing agents, etc., into the mix previous to curing. Fillers conventionally employed with rubbers, e.g., carbon black, finely comminuted graphite, particulated mica, or asbestos, or silica may be used, and carbon black is particularly recommended in that its presence in the cured, molded product generally aids in decreasing solvent-susceptibility of the finished product. A mix of the partially hydrolyzed copolymer and the aromatic diisocyanate may also be extruded into tubes or fibers and cured by heating. Films can be obtained by calendering the mix or by casting it from a melt or from a suitable solvent and then heat-curing the films. The dry mix or a suspension thereof in a volatilizable liquid may also be used as the adhesive for the manufacture of glass of cellulosic laminates, strong, tenacious bond being obtained upon curing. Foamed rubbers may be prepared by incorporating a blowing agent into the blend prior to curing.

The ar,ar-toluenediisocyanates which are useful for the present purpose may have the two isocyanate radicals present at any position of the toluene nucleus; e.g., there may be used 2,4-, 2,6-, 3,5- 2,5-, 2,3- or 3,4-diisocyanatotoluene or a mixture of such diisocyanate. 2,4-diisocyanatotoluene and the dimer thereof are preferred. Mixtures of either the monomeric compounds and/or of the dimers may be used. The diisocyanate must contain no aliphatic carbon other than the one methyl radical which is attached to the benzene nucleus. Otherwise, there will be obtained neither the increased resistance to attack by solvents nor the toughness which results upon curing the hydrolyzed ethylene/vinyl alkanoate copolymer with the monomeric or dimeric ar,ar-diisocyanatotoluene.

The quantity of the aromatic diisocyanate which is employed with the hydrolyzed copolymer can be widely varied, depending upon the nature of the copolymer and the properties desired. Since one isocyanate radical of the diisocyanate reacts with one hydroxy group of the hydrolyzed copolymer, with cross-linking of the polymer chains at one or more sites, the amount of desired cross-linking will dictate the quantity of the aromatic diisocyanate. The quantity required for reacting with all of the hydroxy radicals of the hydrolyzed copolymer can be readily calculated, e.g., from the saponification or hydroxyl number of the hydrolyzed copolymer. One mole of the diisocyanatotoluene provides two isocyanato radicals for the reaction. With a, say, 44.4:55.6 weight ratio (2.43:1 molar ratio) ethylene/vinyl acetate copolymer which has been 41.7% hydrolyzed there may be used as little as say, 0.1 g. of ca. 19 g. of 2,4-diisocyanatotoluene dimer to react with from only a few to all of the hydroxy groups present in 100 g. of the hydrolyzed polymer. In this case, when the quantity of diisocyantotoluene approaches about 19% of the polymer on a weight basis, substantially all of the hydroxy groups of the copolymer will cross-link. However, sufficient cross-linking to give a significant decrease in solvent-susceptibility results even when the quantity of diisocyantotoluene approaches the lower limit. With polymers having a high ethylene content as compared to the sum of the vinyl ester and vinyl alcohol units, it may be advisable not to cross-link all of the hydroxy units, particularly when the percent hydrolysis is on the low side, since residual hydroxy groups will aid materially in maintaining resistance to hydrocarbon fluids in compositions of high ethylene content. Generally, however, particularly in the series of ethylene/vinyl acetate copolymers, maintaining the ethylene concentration of the unhydrolyzed copolymer at not more than the 4.6:1 ethylene/vinyl acetate molar ratio permits complete cross-linking of the hydrolyzed copolymers with the aromatic diisocytantotoluene or dimer thereof to obtain rubbery products, so long as the percent of ester groups which have been hydrolyzed is at least 20% of those present in the unhydrolyzed copolymer. However, softer rubbers, when such are desired, are obtained by decreasing the amount of the diisocyantotoluene compound and hence the amount of cross-linking. Rubbers of lower degree of cross-linking may have even better solvent resistance due to presence of insolubilizing (OH) groups.

The invention is further illustrated by, but not limited to, the following examples.

Example 1

In this example there was employed 41.8% hydrolyzed ethylene/vinyl acetate copolymer prepared by hydrolyzing a 44.4:55.6 weight ratio (2.43:1 molar ratio) ethylene/vinyl acetate copolymer in a 1:1:1 volume ratio mixture of toluene, methanol and ethanol with a catalytic quantity of aqueous potassium hydroxide until the hydrolyzed polymer analyzed 36.6% vinyl acetate by weight.

Five parts by weight of the above hydrolyzed copolymer was milled on a 2-roll mill with 0.92 part of the dimer of 2,4-diisocyanatotoluene, and 4 test specimens were simultaneously molded from the milled mixture at 125° C. and 300 pounds pressure with curing for 45 minutes at 125° C. The Shore hardness "A" and volume of each of the molded specimens were determined, and the specimens were then respectively immersed in one of the following fluids:

(1) Hydrocarbon mineral oil.
(2) American Society for Testing Materials (ASTM) oil No. 1 of ASTM procedure D471–1964, a petroleum hydrocarbon oil.
(3) ASTM oil No. 3 of ASTM procedure D471–1964, a petroleum hydrocarbon oil.

The specimens were kept immersed in the respective fluids for 70 hours at room temperature. They were then removed, dipped in acetone, and blotted dry. The Shore hardness "A" and volume change were determined on the dried specimens. The following results were obtained.

| Test fluid, No. | Volume, percent change | Shore Hardness "A" | |
|---|---|---|---|
| | | Before test | After test |
| (1) Mineral oil | 0.07 | 84 | 83 |
| (2) ASTM No. 1 | 0.40 | 84 | 84 |
| (3) ASTM No. 3 | 0.85 | 83 | 82 |

The above data show substantially no effect of either the mineral oil or of the ASTM fluids on either the volume or the hardness of the test specimens.

Example 2

In order to determine the effect of varying the acetate and hydroxy content of hydrolyzed ethylene/vinyl acetate copolymer, the following hydrolyzed copolymers were cross-linked and tested:

(I) A 43% hydrolyzed ethylene/vinyl acetate copolymer prepared by hydrolyzing a 37.3:62.7 weight ratio (1.83:1 molar ratio) ethylene/vinyl acetate copolymer until the hydrolyzed copolymer analyzed 41.2% vinyl acetate by weight.

(II) A 41.1% hydrolyzed ethylene/vinyl acetate copolymer prepared by hydrolyzing a 45.4:54.6 weight ratio (2.55:1 molar ratio) ethylene/vinyl acetate copolymer until the hydrolyzed copolymer analyzed 36.0% vinyl acetate by weight.

The above partially hydrolyzed copolymers were incorporated into the following formulations:

Parts by weight
(A) Copolymer (I): _____ 100
    2,4-diisocyanatotoluene dimer _____ 20.7
(B) Copolymer (I): _____ 100
    Carbon black (Statex R) _____ 12
    2,4-diisocyanatotoluene dimer _____ 20.7
(C) Copolymer (II): _____ 100
    2,4-diisocyanatotoluene dimer _____ 17.8
(D) Copolymer (II): _____ 100
    Carbon black (Statex R) _____ 12
    2,4-diisocyanatotoluene dimer _____ 17.8

The components of each formulation were mixed together on the rolling mill, and four test specimens of each formulation were molded and cured as in Example 1. Evaluation of the resistance of each of the test specimens to the fluids shown below was conducted by determining the volume and Shore hardness of each specimen before and after immersion in the test fluid for 70 hours at room temperature. The following results were obtained:

| Formulation No. | Test Fluid | Volume, percent change | Shore Hardness "A" | |
|---|---|---|---|---|
| | | | Before test | After test |
| A | Mineral Oil | −0.53 | 89 | 86 |
| | ASTM No. 1 Oil | −1.77 | 89 | 85 |
| | ASTM No. 3 Oil | 0.23 | 89 | 86 |
| | Skydrol ® 7000 | 7.5 | 88 | 87 |
| B | Mineral Oil | −0.51 | 95 | 91 |
| | ASTM No. 1 Oil | 0.63 | 93 | 90 |
| | ASTM No. 3 Oil | −0.65 | 93 | 92 |
| | Skydrol ® 7000 | 4.06 | 94 | 92 |
| C | Mineral Oil | −1.15 | 83 | 82 |
| | ASTM No. 1 Oil | 0.40 | 84 | 84 |
| | ASTM No. 3 Oil | 0.51 | 82 | 82 |
| | Skydrol ® 7000 | 6.55 | 83 | 81 |
| D | Mineral Oil | 1.44 | 86 | 85 |
| | ASTM No. 1 Oil | −0.08 | 87 | 84 |
| | ASTM No. 3 Oil | −0.13 | 86 | 83 |
| | Skydrol ® 7000 | 6.44 | 86 | 81 |

The above data show that with Formulation A, containing the cross-linked product of Copolymer I, a 43% hydrolyzed 1.83:1 molar ratio ethylene/vinyl acetate copolymer, the inclusion of carbon black results in increased resistance to Skydrol 7000, a phosphate-base functional fluid which attacks and greatly deteriorates many of the known elastomers.

Example 3

A 55:45 weight ratio ethylene/vinyl acetate copolymer was hydrolyzed to give a hydrolyzed copolymer analyzing 27.8% by weight of vinyl acetate. Molded test specimens were prepared from either the hydrolyzed copolymer, alone, or from the following formulations:

Parts by weight
(A) Above copolymer, alone _____ 100
(B) Above copolymer _____ 100
    2,4-diisocyanatotoluene _____ 2
(C) Above copolymer _____ 100
    2,4-diisocyanatotoluene _____ 2
    Carbon black (Statex R) _____ 25

The hydrolyzed copolymer, alone, was molded at 150° C./500 p.s.i., and with a 2-minute cure at 150° C. Formulations B and C were molded for one hour at 160° C. In each case, well-dimensioned, hard, elastomeric specimens were obtained. The specimens were tested for resistance to the same mineral oil by immersion for 70 hours at room temperature, the volume being determined before and after immersion. The following results were obtained:

Formulation               Volume percent change
A _____ 8.7
B _____ 1.7
C _____ 1.7

The above data show that resistance to the mineral oil is increased by including the 2,4-diisocyanatotoluene in the mix, with or without carbon black. However, the resistance of the cross-linked polymer of this example is not quite as good as that of Copolymer I of Example 2, which had been more highly hydrolyzed.

As is evident from the above examples, the process of this invention provides a simple and practical method of preparing solvent-resistant, cured rubbers from certain hydrolyzed ethylene/vinyl alkanoate copolymers, and for the production of shaped and molded objects comprising the cured rubbers. The presently provided cross-linked products will be useful in various rubber applications such as hoses, tubings, gaskets and resilient padding, particularly in fields where solvent-resistance is required. Although, for comparative purposes, the above examples are all concerned with hydrolyzed ethylene/vinyl acetate copolymer, the procedures described therein are likewise applicable to the cross-linking, with the aromatic diisocyanatotoluenes or dimers, of ethylene/vinyl alkanoates wherein the alkanoate group is a propionate or a butyrate group instead of the acetate group, and the products obtained with the use of such other hydrolyzed copolymers are likewise rendered less susceptible to solvent attack.

As many widely different embodiments of this invention may be made without departing from the spirit and scope thereof, it is to be understood that this invention is not limited to the specific embodiments thereof except as defined in the appended claims.

What is claimed is:

1. The process wherein a substantially 4.61:1 to 1.3:1 molar ratio ethylene/vinyl alkanoate copolymer which has been 20% to 75% hydrolyzed and in which the alkanoate radical has from 2 to 4 carbon atoms, is blended with at least 0.1% by weight of the hydrolyzed copolymer of an aromatic diisocyante selected from the class consisting of the ar,ar-diisocyanatotoluenes and the dimers thereof, and the resulting blend is heated at 50° C. to 250° C. to obtain a hard, cured rubber.

2. An elastomer comprising the cured reaction product of
    (a) a substantially 4.6:1 to 1.3:1 molar ratio ethylene/ vinyl alkanoate copolymer which has been 20% to 75% hydrolyzed and in which the alkanoate radical has from 2 to 4 carbon atoms with
    (b) an aromatic diisocyanate selected from the class consisting of the ar,ar-diisocyanatotoluenes and the dimers thereof, in the amount of at least 0.1% by weight based on (a).

3. The process wherein a substantially 3.8:1 to 1.6:1 molar ratio ethylene/vinyl acetate copolymer which has been from 20% to 75% hydrolyzed is blended with at least 0.1% of an ar,ar-diisocyanatotoluene dimer and the resulting blend is heated at 50° C. to 250° C. to obtain a hard, cured rubber.

4. An elastomer comprising the cured reaction product of
    (a) a substantially 3.8:1 to 1.6:1 molar ratio ethylene/ vinyl acetate copolymer which has been from 20% to 75% hydrolyzed with
    (b) an ar,ar-diisocyanatotoluene dimer, in the amount of at least 0.1% by weight based on (a).

5. The process wherein a substantially 3.8:1 to 1.8:1 molar ratio ethylene/vinyl acetate copolymer which has been from 35% to 55% hydrolyzed is blended with at least 0.1% of ar,ar-diisocyanatotoluene dimer and the resulting blend is heated at 50° C. to 250° C. to obtain a hard, cured rubber.

6. An elastomer comprising the cured reaction product of
    (a) a substantially 3.8:1 to 1.8:1 molar ratio ethylene/ vinyl acetate copolymer which has been from 35% to 55% hydrolyzed with
    (b) an ar,ar-diisocyanatotoluene dimer, in the amount of at least 0.1% by weight based on (a).

7. A shaped article of the elastomer of claim 6.

8. A composition comprising the reaction product of
    (a) a substantially 4.6:1 to 1.3:1 molar ethylene/ vinyl alkanoate copolymer which has been 20% to 75% hydrolyzed and in which the alkanoate radical has from 2 to 5 carbon atoms with
    (b) an ar, ar-diisocyanatotoluene dimer, in the amount of at least 0.1% by weight based on (a)
    and a filler selected from the class consisting of carbon black, finely comminuted graphite, particulated mica, asbestos, and silica.

9. A shaped article of the composition of claim 8.

10. The process wherein a substantially 3.8:1 to 1.6:1 molar ratio ethtylene/vinyl acetate copolymer which has been from 35% to 55% hydrolyzed is blended with a quantity of 2,4-diisocyanatotoluene dimer calculated to provide substantially one isocyanato group for each hydroxy group present in the hydrolyzed copolymer and the resulting blend is molded under heat and pressure to obtain a hard, shaped, rubbery object.

11. The process wherein a substantially 4.6:1 to 1.3:1 molar ethylene/vinyl alkanoate copolymer which has been 20% to 75% hydrolyzed and in which the alkanoate radical has from 2 to 5 carbon atoms, is blended with at least 0.1% by weight of ar,ar-diisocyanatotoluene dimer and a filler selected from the class consisting of carbon black, finely comminuted graphite, particulated mica, asbestos, and silica, and the resulting blend is molded under heat and pressure to obtain a hard, shaped, rubbery object.

12. The process wherein a substantially 3.8:1 to 1.6:1 molar ratio ethylene/vinyl acetate copolymer which has been 35% to 55% hydrolyzed is blended with carbon black as a filler and a quantity of 2,4-diisocyanatotoluene dimer calculated to provide substantially one isocyanato group for each hydroxy group present in the hydrolyzed copolymer, and the resulting blend is molded under heat and pressure to obtain a shaped, hard, rubbery object.

13. The process which comprises compression molding a blend of a substantially 3.8:1 to 1.6:1 ethylene vinyl/ acetate copolymer which has been from substantially 35% to 55% hydrolyzed, carbon black as a filler, and 2,4-diisocyanatotoluene dimer as a curing agent.

14. A ring seal for hydraulic systems molded by the process defined in claim 13.

15. A composition comprising the reaction product of
    (a) a substantially 3.8:1 to 1.6:1 molar ratio ethylene/ vinyl acetate copolymer which has been 35% to 55% hydrolyzed with
    (b) a quantity of 2,4-diisocyanatotoluene dimer calculated to provide substantially one isocyanato group for each hydroxy group present in the hydrolyzed copolymer.
    and carbon black as a filler.

16. A shaped article of the composition of claim 15.

17. A composition comprising the reaction product of
    (a) a substantially 3.8:1 to 1.6:1 ethylene/vinyl acetate copolymer which has been from substantially 35% to 55% hydrolyzed with
    (b) 2,4-diisocyantotoluene dimer, in the amount of at least 0.1% by weight based on (a)
    and carbon black as a filler.

18. A shaped article of the composition of claim 17.

References Cited

UNITED STATES PATENTS

| | | | |
|---|---|---|---|
| 2,403,465 | 7/1946 | Pease | 260—27 |
| 3,025,268 | 3/1962 | Deex et al. | 260—77.5 |
| 3,111,500 | 11/1963 | Bartl et al. | 260—41 |
| 3,228,998 | 1/1966 | Fierce et al. | 252—78 |
| 3,264,269 | 8/1966 | Rees | 260—77.5 |
| 3,283,029 | 11/1966 | Brilland et al. | 252—78 |

ALLAN LIEBERMAN, *Primary Examiner.*